United States Patent [19]

Lafreniere

[11] 4,402,411
[45] Sep. 6, 1983

[54] APPARATUS FOR SEPARATING ARTICLES

[76] Inventor: Edgar A. Lafreniere, R.R. 3, Grafton, N. Dak. 58237

[21] Appl. No.: 287,216

[22] Filed: Jul. 27, 1981

[51] Int. Cl.³ .............................................. B07C 5/00
[52] U.S. Cl. .................................. 209/617; 209/620; 209/667; 209/674
[58] Field of Search ............... 209/665, 617, 618, 620, 209/667, 674; 171/14, 15; 130/DIG. 7, 30 R; 56/327 R, 328 R

[56] References Cited

U.S. PATENT DOCUMENTS

| | | | |
|---|---|---|---|
| 1,837,299 | 12/1931 | Taggart | 209/618 |
| 1,980,517 | 11/1934 | Good | |
| 2,624,458 | 1/1953 | Molnau | |
| 2,867,322 | 1/1959 | Weisenfeld | |
| 2,877,475 | 3/1959 | Henry | |
| 3,473,659 | 10/1969 | Berticevich | |
| 3,713,537 | 1/1973 | Walker | 209/665 |
| 4,240,902 | 12/1980 | Agee | |

OTHER PUBLICATIONS

A brochure entitled "Mark XL A Superior Potato Harvester," Lockwood, 4 pp.
A brochure entitled "Dahlman M-Table," Dahlman NFD, Inc., 2 pp.

Primary Examiner—Robert B. Reeves
Assistant Examiner—Donald Hajec
Attorney, Agent, or Firm—Merchant, Gould, Smith, Edell, Welter & Schmidt

[57] ABSTRACT

An apparatus (10) for separating articles is disclosed. Apparatus (10) includes a frame (16) having upper and lower portions (24, 26) yieldably separated by compression springs (28). Belts (90) extend between drive rollers (30) supported by upper frame portion (24) and driven rollers (42) supported by lower frame portion (26). A plurality of longitudinal members (88) are attached to each shaft (86) of driven rollers (42). Mud which might otherwise plug an eliminator is removed from belts (90) as they variably flex in passing about driven rollers (42).

11 Claims, 9 Drawing Figures

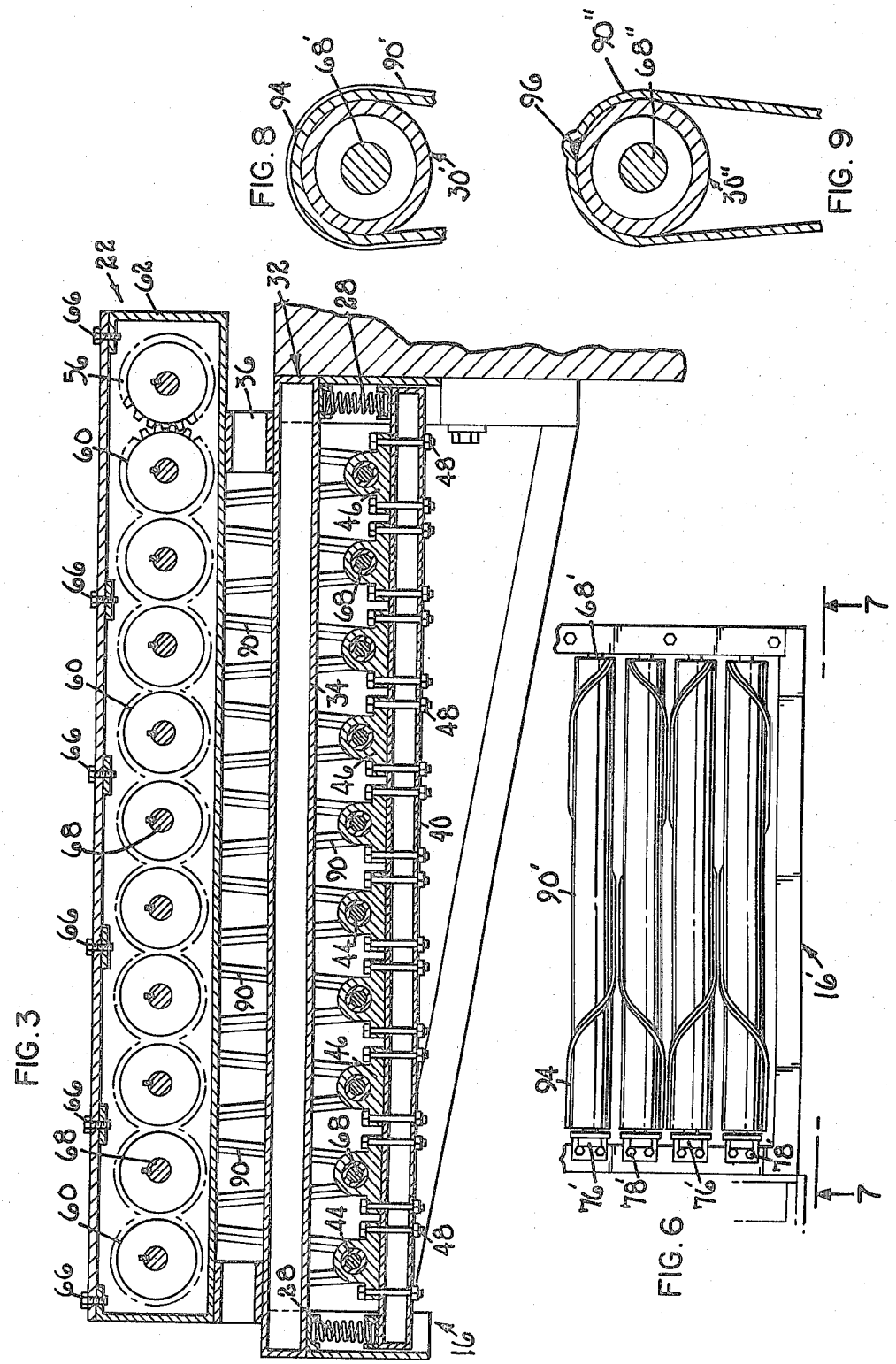

APPARATUS FOR SEPARATING ARTICLES

TECHNICAL FIELD

This invention relates to an apparatus for separating articles and, more particularly, to a mud and clod eliminator commonly integrated among a series of conveyors and elevators in a potato harvester.

BACKGROUND OF THE INVENTION

Apparatus for separating vegetable articles from clods and other debris are known. Generally, these apparatus are used in combination with the conveyors and elevators of a harvesting machine for the particular article.

A typical device is shown in U.S. Pat. No. 3,473,659. The apparatus is comprised of a pair of counter-rotating rollers covered with a soft rubber material. Vegetable articles, such as tomatoes, fall from a conveyor onto the rollers. The rollers are inclined and spaced allowing the tomatoes to move from one end to the other while clods of dirt fall between the rollers. The tomatoes then fall onto another conveyor. Brush elements contact the underside of the rollers to continually sweep them clean.

Other models of similar apparatus show roller variations, such as brushes in place of rollers or alternate rollers having flights which keep the vegetable articles raised from the core of the roller but allow rocks and dirt clods to fall through.

Eliminating apparatus which use rollers and brushes, however, are prone to plugging, especially in mud or clay-type soils. Plugging causes breakage and costly down-time. This is sufficiently troublesome that many harvesters do not have any type of eliminating apparatus. Rather, three or four field workers stand along the sides of a picking table-type conveyor, which otherwise would be an eliminating apparatus. The field workers manually separate the vegetable articles from the trash.

SUMMARY OF THE INVENTION

In one embodiment, the present invention is directed to a lump eliminator comprising a frame, adjacent endless belts rotatably supported from the frame, and means for rotationally driving the adjacent belts. The belts are spaced to prevent articles from passing between them while allowing smaller items to pass therethrough. In this fashion, the belts retain the usable articles along upper surfaces, while allowing unwanted articles and debris to pass between and be eliminated.

In a preferred embodiment, the lump eliminator includes a frame having upper and lower portions. A plurality of drive rollers are rotatably supported by the upper portion. A similar number of driven rollers are rotatably supported by the lower portion. An apron belt extends about and between one of each of the drive and driven rollers. The lower frame portion is yieldably connected to the upper frame portion in order to provide tension to the belts. A plurality of longitudinal members are attached to each of the driven rollers so that as a belt rotates about a driven roller, it is bent more whenever it encounters a longitudinal member. Thus, it flexes to a greater extent and breaks loose any mud which may have caked onto it.

The driving mechanism includes a motor having a drive gear attached to the drive shaft. The drive gear connects with a series of driven gears, one of each being attached to a drive roller. The plurality of gears are encased in an oil bath for efficient operation. Preferably, each drive roller has a pulley attached to it. The apron belts have a mating V-shaped protrusion for being received in a respective pulley. In this fashion, the pulleys both retain the belts from traveling longitudinally along the rollers and rotationally drive the belts.

An eliminator having apron belts provides the capability of the flexing which occurs with an endless belt when changing direction from straight-line travel to arcuate travel at an end. Such flexing leads to the advantageous elimination of mud. The present invention shows the even more desirable feature of variable flexing caused by the plurality of longitudinal members regularly fastened to the driven rollers.

The present invention additionally solves the problem of longitudinal belt creep by installing pulleys on each of the drive rollers and having mating V-protrusions on the underside of the various belts.

An eliminator in accordance with the present invention thus vastly reduces the possibility of plugging and, hence, reduces farm labor and maintenance costs.

These and other advantages obtained by the use of the present invention may be better understood by reference to the drawings which form a further part hereof and to the accompanying descriptive matter in which there is illustrated and described a preferred embodiment of the invention.

BRIEF DESCRIPTION OF THE DRAWINGS

FIG. 3 is a cross-sectional view, taken along lines 3—3 of FIG. 1, of the gearbox and frame showing the belts in an end view;

FIG. 6 is a top, plan view of an alternate embodiment of an apparatus in accordance with the present invention;

FIG. 8 is a sectional view, taken along line 8—8 of FIG. 7, of a single roller and belt assembly; and FIG. 9 is a sectional view of another embodiment very similar to FIG. 8 of a roller and belt assembly.

DETAILED DESCRIPTION OF THE INVENTION

Figure 1:
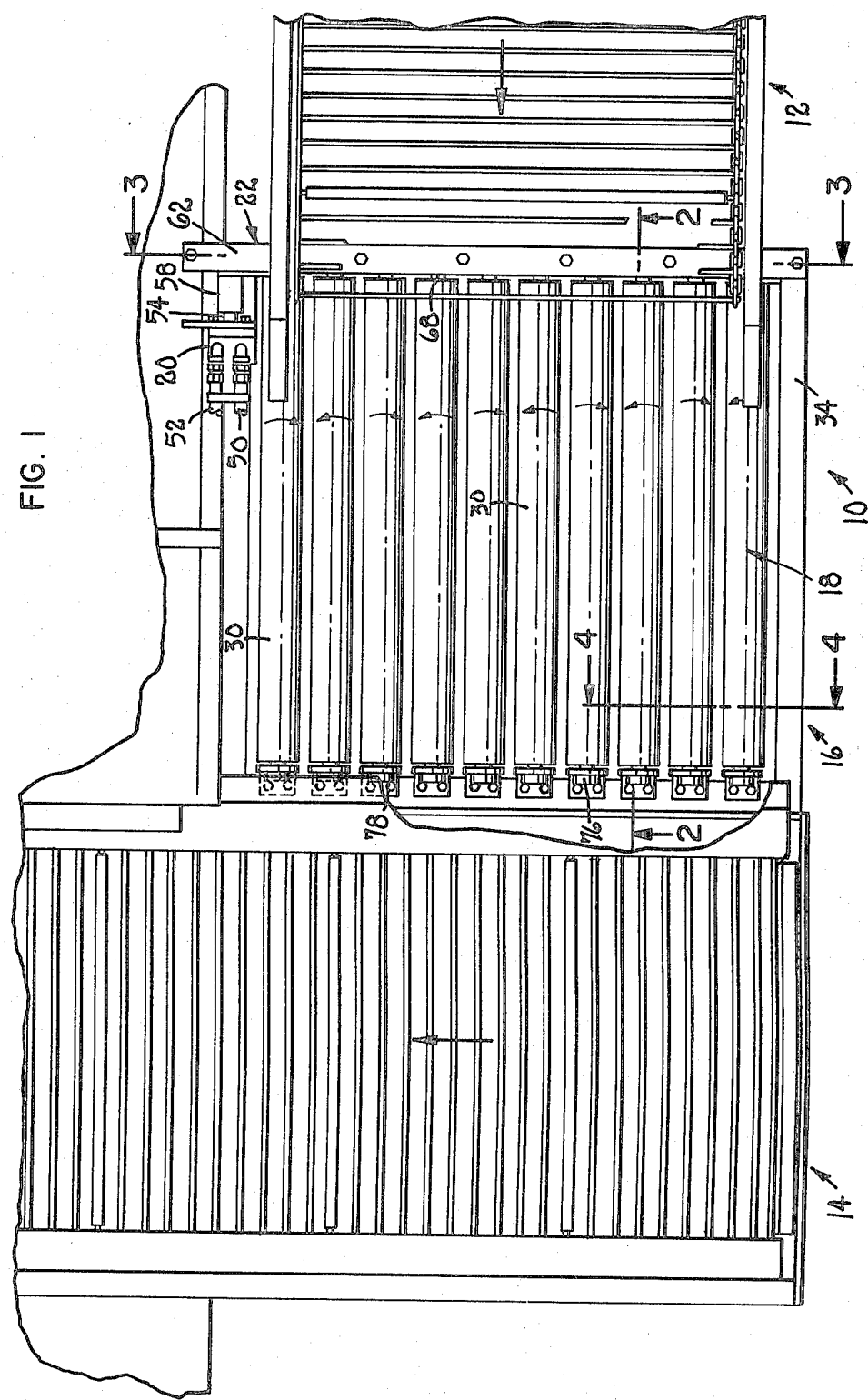
FIG. 1 is a top, plan view of an apparatus in accordance with the present invention in conjunction with delivery and removal conveyors.

Referring now to the drawings wherein like reference numerals designate identical or corresponding parts throughout the several views, and more particularly to FIG. 1, an apparatus for separating particles in accordance with the present invention is designated generally as 10. A side elevator or conveyor 12 is shown as a delivery mechanism for moving potatoes or other vegetable articles from a digging region to eliminator apparatus 10. A truck loading elevator or conveyor 14 is shown as a take-away conveyor for articles from the eliminator apparatus 10. When apparatus 10 is used in a harvester, the attachment mechanisms for apparatus 10, delivery conveyor 12, and loading conveyor 14, are of a type commonly known to those skilled in this art.

In a preferred embodiment, lump eliminator apparatus 10 is comprised of a frame 16 which holds a plurality of belt assemblies 18 driven by a motor 20 through a gear box 22. Frame 16 is comprised of upper and lower portions 24 and 26 separated by compression springs 28. Upper frame portion 24 supports gear box 22 and drive rollers 30. Upper frame portion 24 includes a substantially square, primary framework 32 comprised of square tubes 34 welded or otherwise fastened together. A pair of brackets 36 (see FIG. 3) are fastened near the ends of primary framework 32 on the input or delivery conveyor side of apparatus 10. Gear box 22 is supported by attachment to brackets 36. Guide tubes 38 extend downwardly from the four corners of primary framework 32 to retain lower frame portion 26 relative to upper frame portion 24. Guide tubes 38 are essentially channels having open ends facing each other at both the delivery and loader conveyor ends.

Lower frame portion 26 is comprised of a pair of square tubes 40 for slidable retention within guide tubes 38. Driven rollers 42 are rotatably attached and extend between tubes 40. Driven rollers 42 are supported by bearings 44 retained to tubes 40 with brackets 46. Brackets 46 are attached to tubes 40 with nut and bolt combinations 48. Springs 28 are located within guide tubes 38 and are retained in compression by cylindrical cups 49 welded or otherwise attached to the upper surface of tubes 40 and the lower surface of primary framework 32.

Figures 2, 5:
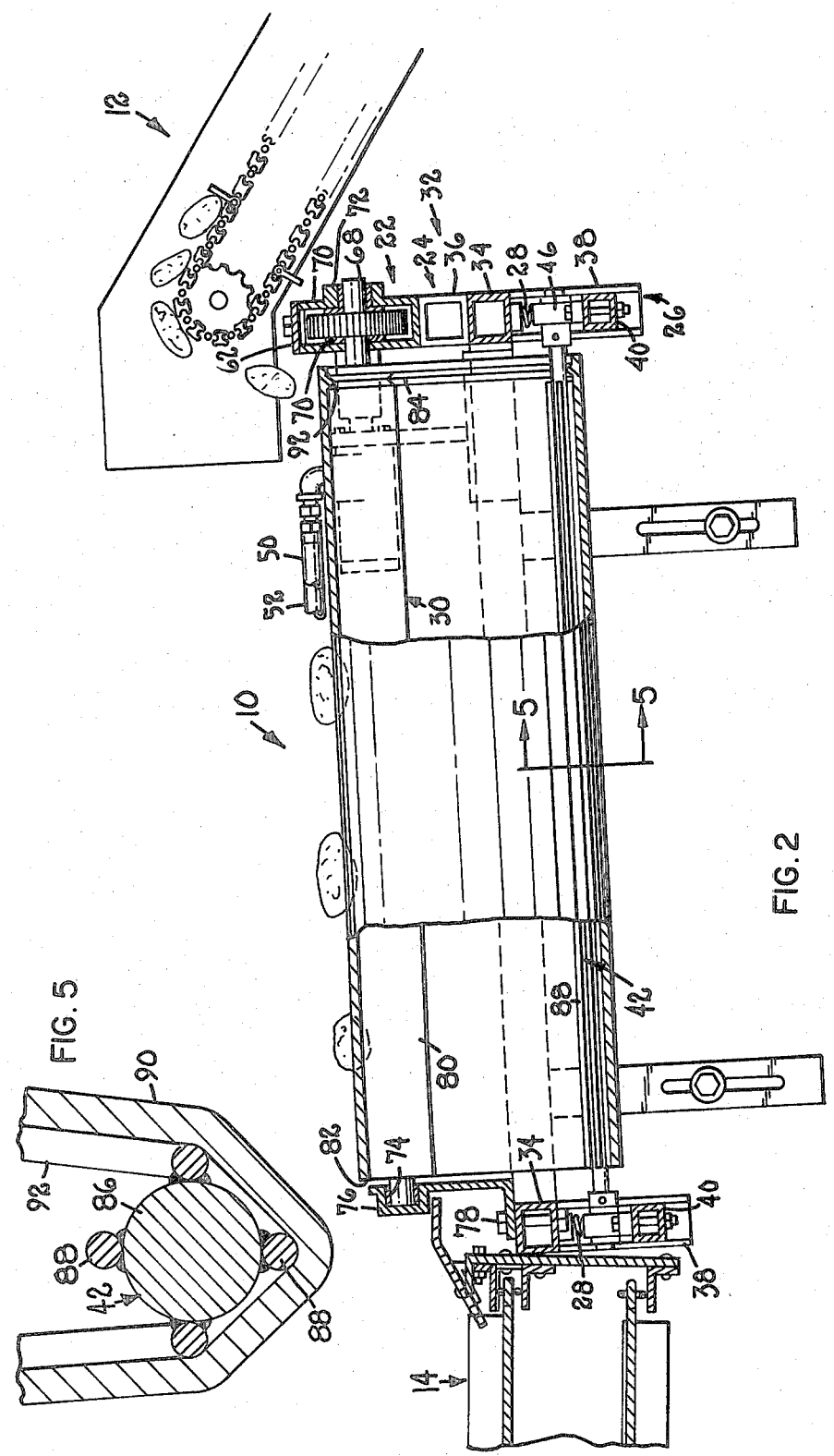
FIG. 2 is a partial sectional, side view of the apparatus in FIG. 1.
FIG. 5 is a detail, sectional view of a driven roller with attached longitudinal members.
Figure 4:
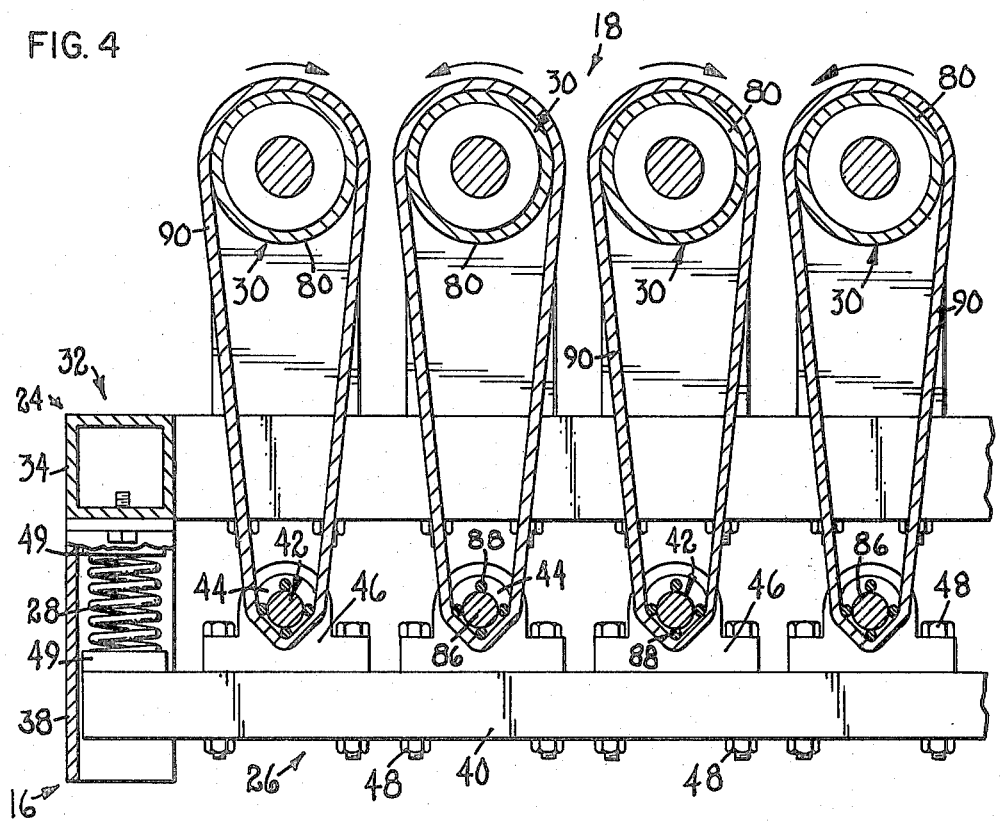
FIG. 4 is a cross-sectional view, taken along line 4—4 of FIG. 1, showing several belts and rollers in cross-section.

Apron belt assemblies 18 are driven by motor 20 through a series of gears contained in gear box 22. Motor 20 may be powered in various ways as known to those skilled in the art. In FIGS. 1 and 2, an hydraulic motor is shown. Input and output lines 50 and 52 direct fluid to and from motor 20. Drive shaft 54 is connected with drive gear 56 by coupler 58. Drive gear 56 meshes with a first driven gear 60. A series of similar driven gears 60 then interconnect consecutively so all are simultaneously rotated by drive gear 56. In this fashion, every other driven gear 60 rotates in the same direction while the other alternate gears 60 rotate in the opposite direction.

Gear box 22 is rectangular in shape having a body 62 with a cover 64 attached by bolts 66 or otherwise. Gear box 22 forms an enclosure preferably filled with a light oil for efficient interconnection and rotation of gears 56 and 60. Drive shaft 54 and shafts 68 of drive rollers 30 extend through both sides of gear box 22 and are sealed at the openings through which they pass with standard seals 70. Drive shaft 54 and the shafts 68 of drive rollers 30 are supported on the side of gear box 22 opposite drive rollers 30 with commonly known sealed bearings 72 which are attached to gear box 22. Drive rollers 30 are supported at the output or loading conveyor end of lump eliminator apparatus 10 by commonly known sealed bearings 74 supported by brackets 76 extending upwardly from primary framework 32 of upper frame portion 24. Brackets 76 are attached to primary framework 34 with nut and bolt combinations 78 or by other attachment mechanisms.

Drive rollers 30 are comprised of a cylindrical tube 80 having a circular endplate 82 at the output or loading conveyor end and a pulley 84 at the input or delivery conveyor end. Endplate 82 and pulley 84 are welded or otherwise attached to the respective ends of tube 80. Shaft 68 passes through tubes 80 on the centerlines thereof. Shafts 68 are welded or otherwise fixed to endplates 82 and pulleys 84. Thus, as driven gears 70 are rotated, shafts 68 which are fixed to driven gears 70 cause rollers 30 to rotate and drive apron belts 18.

As shown in FIG. 5, driven rollers 42 include a shaft 86 having a plurality of secondary longitudinal, cylindrical members 88 welded or otherwise attached to shaft 86. As indicated previously, shafts 86 of driven rollers 42 are supported by bearings 44 which are retained to lower portion 26 of frame 16.

Apron belt assemblies 18 thus include an apron belt 90 being driven by a drive roller 30 about a driven roller 42. Apron belt 90 is a reinforced rubber belt having a V-shaped protrusion 92 (see FIG. 2) extending inwardly for alignment with and reception by pulley 84. Cooperation between protrusion 92 and pulley 84 not only aids in driving belt 90, but also locates belt 90 and prevents it from creeping longitudinally in either direction. It is to be understood, of course, that pulleys 84 are not necessary for driving belts 90 and could be eliminated or located on driven rollers 42 to prevent the indicated longitudinal creeping. A preferred type of belt 90 is used on the M-90-D and M-180-D draper model windro pickup and may be obtained from Melroe Company, Gwynner, N. Dak. 58040.

Figure 7:
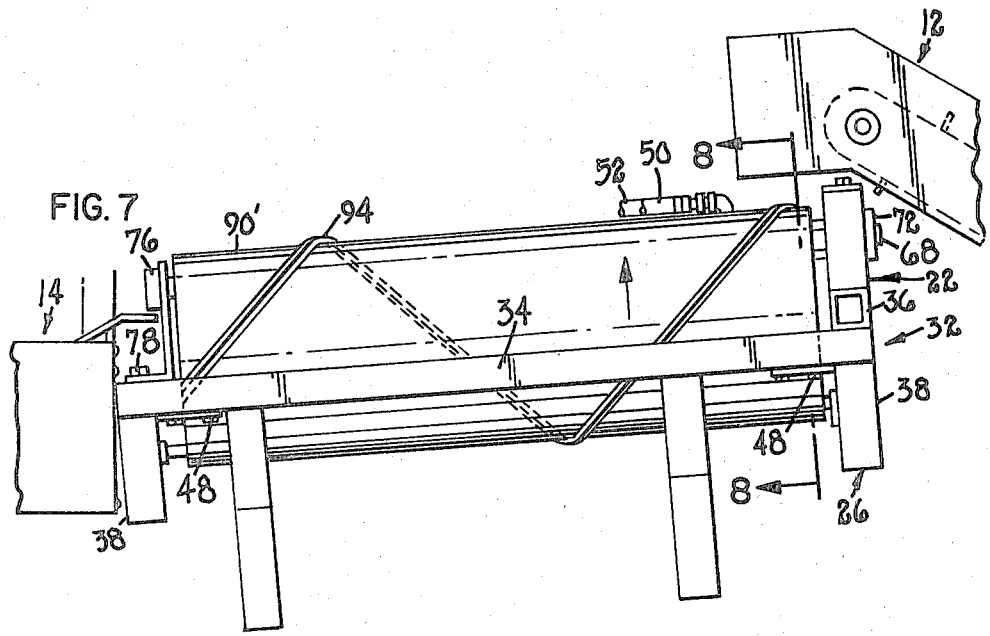
FIG. 7 is a side view of the apparatus shown in FIG. 6.

In an alternate embodiment as shown in FIGS. 6-8, belt 90' has a flight 94 for moving vegetable articles from the input to the output side of lump eliminator apparatus 10. Since adjacent belt assemblies 18 move in opposite directions, flights 94 likewise spiral in opposite directions on adjacent assemblies 18 as shown in FIG. 6. Rather than fabricating a flight 94 onto belts 90', a second alternative would use a rod 96 (see FIG. 9) spirally wrapped and fastened to each drive roller 30". With a belt 90" under tension about a portion of roller 30", the rod 96 would influence the shape of the outer surface of belt 90" in the form of flights and thereby move articles in a manner similar to belt 90' of the first alternate embodiment.

To operate, apparatus 10 is ordinarily installed between a delivery conveyor 12 and a loading or takeaway conveyor 14. The installation may be on a vegetable harvester or in conjunction with some other apparatus or installation, for example, a sorting and packaging conveyor system. Motor 20 is connected with a source of power. In the embodiment described hereinbefore, hoses 50 and 52 are connected to a hydraulic power system. When motor 20 is turned on, it rotates drive gear 56 which in turn drives consecutively interconnected driven gears 60. Driven gears 60 are attached to shafts 68 of drive rollers 30 and, consequently, cause drive rollers 30 to rotate in the directions of driven gears 60. Apron belts 90 pass endlessly about drive rollers 30 and driven rollers 42. With protrusions 92 received within pulleys 84, drive rollers 30 rotate apron belts 90. As belts 90 pass about driven rollers 42, belts 90 flex to a greater and lesser extent depending on whether a particular portion of the belt encounters a longitudinal member 88 or not. This feature is particularly advantageous in that mud or clay often sticks to roller assemblies of vegetable harvesters so as to plug them. With the present apparatus 10, sticky mud is readily displaced from an apron 90 when it flexes variably as it passes about driven rollers 42. Since driven rollers 42, as assemblies, are not cylindrical, the distance between drive and driven rollers 30 and 42 varies. Thus, lower portion 26 of frame 16 must continuously move up and down in order to keep a proper tension on belts 90. Compression springs 28 function to allow upper and lower portions 24 and 26 of frame 16 to yieldably move with respect to one another.

Since driven gears 60 are consecutively interconnected with drive gear 56, one gear 60 rotates oppositely with respect to gears 60 on both sides of it. Consequently, one belt assembly 18 rotates oppositely with respect to adjacent belt assemblies 18. As vegetable articles drop or are placed onto apparatus 10, the articles tend to gather between two belt assemblies 18 where belts 90 are moving downwardly. Clumps, mud and other debris move downwardly between the adjacent belt assemblies 18 while the vegetable articles are held near the top and move longitudinally either under the force of gravity or alternatively from the pushing by flights 94 or from belts 90" formed to have flights by spiral rods 96 attached to each roller 30" as described hereinbefore. If a rock or other large clump becomes stuck between adjacent belt assemblies 18, motor 20 is simply reversed thereby causing the rock or clump to be expelled upwardly. Thus, as vegetable articles are delivered on conveyor 12 to the input end of lump eliminator apparatus 10, the pairs of belt assemblies 18 cooperate to efficiently move articles longitudinally from the input end to the output end for conveyance away on loading or take-away conveyor 14.

The foregoing description has, thus, given numerous characteristics and advantages of the present invention, together details of structure and function. It is to be understood, however, that the disclosure is illustrative only. Consequently, any changes made, especially in matters of shape, size and arrangement, to the full extent extended by the general meaning of the terms in which the appended claims are expressed, are within the principle of the invention.

What is claimed is:

1. An apparatus for separating articles from an aggregate of mud, dirt clumps and other debris, comprising:
   a frame;
   a pair of adjacent endless apron belts;
   means for rotatably supporting said belts from said frame, said belts being spaced to prevent said articles from passing between them while allowing smaller items of dirt and debris to pass therethrough;
   means for rotationally driving said belts in counterrotating directions so adjacent surfaces move downwardly and outwardly away from each other; and
   means for continuously flexing a portion of each of said belts to prevent mud or other debris from adhering to said belts, whereby said belts remain free from mud and debris in order to separate constantly and efficiently said articles from the aggregate of mud, dirt clumps and other debris.

2. An apparatus in accordance with claim 1 wherein said frame includes upper and lower portions and wherein said supporting means includes a plurality of drive rollers rotatably supported by the upper portion of said frame and a plurality of driven rollers rotatably supported by the lower portion of said frame, each of said belts extending about and between one of each of said drive and driven rollers.

3. An apparatus in accordance with claim 2 wherein said driving means includes a motor, a drive gear and driven gears, said motor being connected to a drive gear, said drive gear interconnecting with and driving a first driven gear, said first driven gear interconnecting with and driving a second driven gear, each of said driven gears being attached to a drive roller for rotating said belts.

4. An apparatus in accordance with claim 3 wherein said drive and driven gears are contained within an oil bath enclosure.

5. An apparatus in accordance with claim 3 wherein said motor is reversible whereby said counterrotating belts may be reversed to release a rock or other debris which may become caught between adjacent belts.

6. An apparatus in accordance with claim 2 wherein each of said drive rollers has a pulley fastened thereto and wherein each of said belts has opposite ends and an under surface with a V-protrusion extending endlessly along the under surface at one end thereof, said V-protrusion being aligned with said pulley and being driven thereby.

7. An apparatus in accordance with claim 2 wherein each of said driven rollers has a shaft and said flexing means includes a plurality of secondary members attached longitudinally to each of said driven roller shafts whereby one of said belts passing about one of said driven rollers is caused to flex more severely whether it passes about a secondary member than when it passes about the shaft of said one driven roller.

8. An apparatus in accordance with claim 1 wherein said belts have opposite ends and outer and under surfaces, said pair of belts having oppositely directed spiral flights protruding from the outer surface, said flights operating to direct articles between said adjacent pair of belts from one end to the opposite end.

9. In a potato harvester having a series of conveyors and elevators for moving potatoes from a digging region to a truck box or other hauling container, a lump eliminator for removing mud, dirt clumps, and other debris from the potatoes, said lump eliminator being located among the series of conveyors and elevators and attached to said harvester, said lump eliminator comprising:
   a frame having upper and lower portions, said lower portion being yieldably connected to said upper portion;
   a plurality of drive rollers rotatably supported by the upper portion of said frame, each said drive roller including a pulley attached to an end thereof;
   a plurality of driven rollers rotatably supported by the lower portion of said frame;
   a plurality of adjacent, endless apron belts, each said belt having a retaining protrusion along an undersurface near an end, each said belt extending about and between one of each of said drive and driven rollers, said retaining protrusion being received within said pulley for rotatably driving said belt, said belts being spaced to prevent potatoes from passing between them while allowing mud, dirt clumps, and other debris to pass therethrough;
   a plurality of longitudinal members attached to each of said driven rollers causing said belts to flex more severely whenever passing about a longitudinal member than when passing about said driven roller in regions between longitudinal members; and
   means for rotationally driving adjacent drive rollers in opposite directions, said driving means including a motor connected to a drive gear, said drive gear interconnecting a plurality of driven gears, each said drive roller being attached to a driven gear;
   whereby an aggregate of potatoes, mud, dirt clumps, and other debris is separated as it moves from one end to another of said lump eliminator, said potatoes being retained between a pair of counter-rotating belts, dirt clumps, and debris falling between said belt, mud being ejected from sticking to said belts by the flexing of said belts about said driven rollers and said longitudinal members.

10. An apparatus for separating articles, said articles having a direction of flow across said apparatus, said apparatus comprising:

a frame having separate upper and lower portions;

a plurality of drive rollers supported by one of said upper and lower portions;

a plurality of driven rollers supported by the other of said upper and lower portions;

a plurality of endless belts, each of said belts extending between one of said drive rollers and one of said driven rollers; said belts supporting said lower portion of said frame from said upper portion, said belts being spaced to prevent articles from passing between them while allowing smaller items to pass therethrough;

means for yieldably separating said upper and lower portions of said frame whereby said belts are caused to tighten about said drive and said driven rollers; and means for driving said drive rollers, said drive rollers thereby driving said belts, said belts being driven in directions perpendicular to the direction of flow of said articles.

11. An apparatus in accordance with claim 10 wherein said upper frame includes guides and said lower frame includes elements for slideable retention within said guides, and wherein said yieldable, separating means includes springs within said guides between said elements and said upper frame.

* * * * *